United States Patent
Brandes

(10) Patent No.: US 6,926,592 B2
(45) Date of Patent: Aug. 9, 2005

(54) SURFACE TREATMENT OF MECHANICALLY ABRADED GLASS

(75) Inventor: Anita G. Brandes, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 46 days.

(21) Appl. No.: 10/722,291

(22) Filed: Nov. 25, 2003

(65) Prior Publication Data

US 2005/0113004 A1    May 26, 2005

(51) Int. Cl.[7] .................................................. B24B 1/00
(52) U.S. Cl. .............................. 451/54; 451/53; 451/7
(58) Field of Search ................................ 451/54, 53, 7, 451/75, 29, 33

(56) References Cited

U.S. PATENT DOCUMENTS

| | | | |
|---|---|---|---|
| 5,365,790 A | * 11/1994 | Chen et al. | .................. 73/724 |
| 6,521,862 B1 | 2/2003 | Brannon | |
| 2004/0077117 A1 | * 4/2004 | Ding et al. | .................. 438/51 |

* cited by examiner

Primary Examiner—Dung Van Nguyen

(57) ABSTRACT

A method of treating the surface of mechanically abraded glass includes a first step of providing a glass substrate having opposing first and second surfaces. The glass substrate having a recess in the first surface formed by abrasion, such as sand blasting. The glass substrate can also include a via therethrough, formed by said abrasion technique. A next step includes heating the glass substrate to its softening point. A next step includes holding the glass substrate at its softening point for a predetermined period of time to polish the recess and vias. This polishing returns transparency to the glass and reduces the possibility of crack propagation by reducing stress points and microcracks.

19 Claims, 3 Drawing Sheets

SURFACE TREATMENT OF MECHANICALLY ABRADED GLASS

FIELD OF THE INVENTION

This invention in general relates to packaging for microdevices and, more particularly, to a method for surface treating abrasively worked glass using thermal processing.

BACKGROUND OF THE INVENTION

The microdevices manufactured by microelectromechanical (MEMS) technology are playing key roles in many areas. For instance, micromechanical gyroscopes have enabled several important control systems in transportation and commercial applications. Other microdevices such as pressure sensors, accelerometers, actuators and resonators fabricated by MEMS technology are also used in many areas. In addition, MEMS technology can be used to construct packaging using the same wafers from which the MEMS devices are made. For example, recesses can be formed in a wafer to create a cavity when mated to another wafer used to construct a MEMS device.

Some microdevices, such as micro gyroscopes and resonators contain a microstructure that needs to be maintained within a vacuum-sealed cavity. For these types of devices, there is a continuing need to improve the methods and techniques to hermetically seal the cavity to increase device lifetime. Pressure increases due to several sources can degrade device performance and reduce device lifetime for hermetically sealed microdevices.

One source that may cause pressure to increase in the cavity of a microdevice is inadequate sealing methods and techniques. For example, a microstructure has electrodes that need to be electrically connected to the outside environment in an appropriate way to meet further level packaging requirements, for instance, a surface mount capability. A suitable feedthrough design and hermetic seal method around the feedthroughs are needed to ensure a complete electrical connection and an appropriate cavity vacuum level over a device's lifetime.

For a wafer level hermetical seal, it has been known to electrically connect the electrodes of a microstructure through certain types of conductive vias formed in a wafer. This approach, however, has several disadvantages. For example, the formation of conductive vias in a wafer may result in mechanical damage to the microstructure mounted on the wafer. Additionally, vacuum degradation may occur over time due to microcracks or other defects in the conductive via. This is especially true if the conductive via extends into the vacuum-sealed cavity that houses the microstructure.

In addition, the different techniques used to manufacture recesses in a wafer to form a cavity cause their own problems that can contribute to leaks in the hermetic seal or other manufacturing problems. For example, recesses can be formed by chemical etching. However, this technique requires expensive equipment, uses dangerous acids, requires a long amount of time to accomplish, and requires various processing steps, methodologies, and precautions to prevent the etching of other surfaces on wafer that are desired to be left pristine. Moreover, it is very difficult to etch a wafer in preferential directions to obtain a desired cavity dimension.

Mechanical abrasion, such as sand blasting, can work beneficially to quickly remove material to form a recess without the manufacturing problems associated with etching. Moreover, mechanical abrasion can be accomplished at a reasonable cost. However, mechanical abrasion causes surface defects and damage problems. For example, mechanical abrasion results in a rough-textured, and microcracked surface. In addition, for transparent wafers, such as glass, mechanical abrasion results in an opaque surface, limiting an avenue to analyze the mechanical workings of an embedded device. In addition, vias made by mechanical abrasion can not be uniformly metalized due to the rough-textured surface and the rough-textured surface of the via walls has a high potential for failure due to crack propagation during subsequent high temperature solder processing.

Therefore, it is desirable to provide an improved technique to manufacture hermetically sealed microdevice packaging that overcomes most, if not all, of the preceding problems. It would also be beneficial if a technique could be provided to remove the damage in a glass cavity due to mechanical abrasion including restoring transparency, reducing stress cracking and improving surface finish.

Figure 1:
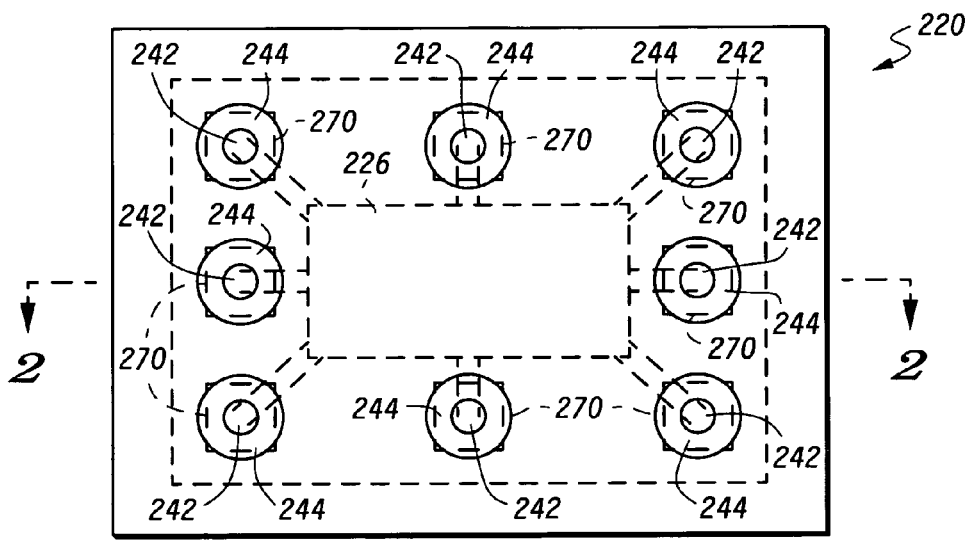
FIG. 1 is a top view of one embodiment of a microdevice having conductive feedthroughs for electrically connecting a microstructure in the microdevice to the outside environment, in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the broad scope of the invention as defined by the appended claims.

DETAILED DESCRIPTION OF THE PREFERRED EMBODIMENT

The present invention provides an improved technique to manufacture hermetically sealed microdevice packaging. In particular, the present invention provides a thermal processing technique to reduce the effects of damage to glass caused by mechanical abrasion working. Specifically, a thermal process technique is used to "polish" glass after sand blast processing by heating the glass to its softening point and holding that temperature for a specific time in order to restore transparency and surface finish and substantially reduce stress defects and microcracking. It should be noted that it is not necessary to totally remove such problems, but only to reduce to them to an appropriate degree such that subsequent processing does not induce leaks that would destroy the hermetic seal of the microdevice packaging.

What is described below is a microdevice package having conductive feedthroughs for electrically connecting a sealed microstructure in the microdevice to the outside environment. For purposes of illustration and description, the packaging of a micro gyroscope will be used. However, the present invention is not limited to the packaging of micro gyroscopes but can also apply to other microdevices and structures that need to be maintained within a cavity. One of ordinary skill in the art having the benefit of this disclosure will realize that the devices and procedures described herein for making such devices could be used in other applications.

Figure 2:
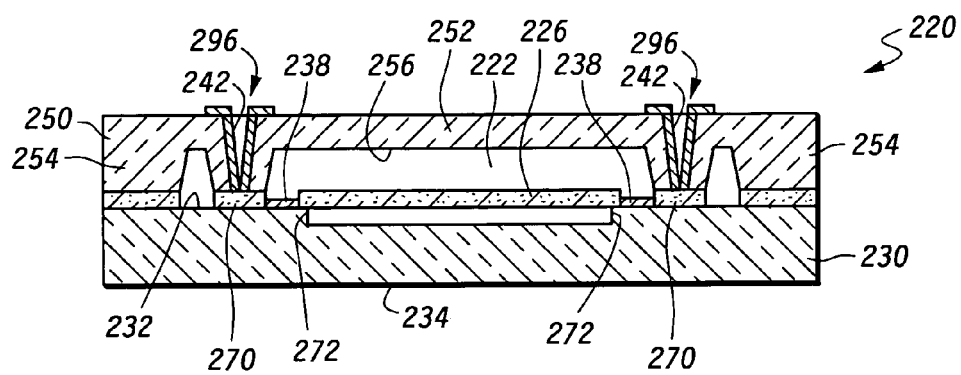
FIG. 2 is a cross-sectional view of the microdevice shown in FIG. 1.
Figure 3:
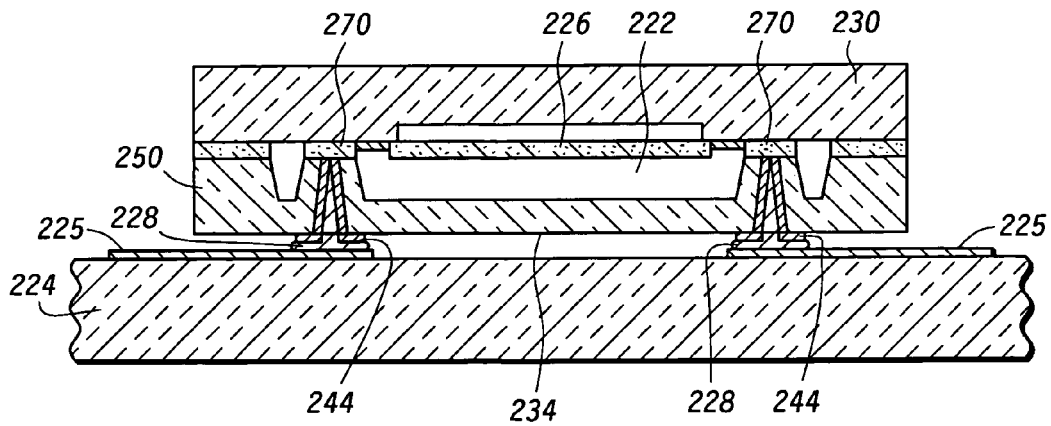
FIG. 3 is a cross-sectional view of the microdevice shown in FIG. 1 when used in a surface mount application.

Turning to the drawings, FIGS. 1–3 show one embodiment of a microdevice 220 having a hermetically sealed cavity 222 at the wafer level. FIG. 1 shows the top view of the microdevice 220 with a plurality of vertical conductive feedthroughs 242 (vias). FIG. 2 is a cross-sectional view of the microdevice 220 across the dashed line 2–2' shown in FIG. 1. As seen here, the vertical conductive feedthroughs 242 in this embodiment extend through a cap 250 and terminate at horizontal conductive feedthroughs 238 attached to the surface of the substrate 230. As seen here, the horizontal conductive feedthroughs 238 in this embodiment extend on a substrate 230 from a microstructure 226 to a conductive cover 270. FIG. 3 is a cross-sectional view of the microdevice 220 mounted to a circuit board 224 as used in a surface mount application.

The microdevice 220 may be a sensor having a microstructure 226 attached to the substrate 230. Here, the microdevice 220 may be the type that can provide sensing capabilities. For example, a micro gyroscope senses angular rate. For purposes of illustration, the description and figures are shown in the context of a sensor. One of ordinary skill in the art with the benefit of this disclosure will recognize, however, that the present invention may apply to other applications.

The microdevice 220 has a hermetically sealed cavity 222 that houses a microstructure 226. The microdevice 220 can comprise a substrate 230 and a cap 250 sealed thereto. Preferably, the microdevice 220 requires electrical connections to the device microstructure 226 shown as conductive feedthroughs 238. Providing a hermetic seal around the feedthroughs 238 is best facilitated by a conductive cover 270 that can be doped to support an electrical connection to outside of the package. The device microstructure 226 can be mounted within the hermetically sealed cavity 222 at various anchor points 272 and connected to the conductive feedthroughs 238. The microstructure may be a moving structure such as those used for a gyroscope or other microdevices.

The substrate 230 has a top side 232 and a bottom side 234. The substrate 230 has a set of conductive traces 238 formed on at least a portion of the top side 232 of the substrate 230. Each conductive trace 238 electrically connects one of the electrodes of the microstructure 226 to one of the vertical conductive feedthroughs 242 or vias 296.

For surface mounting applications, and as illustrated in FIG. 3, the conductive vias 296 have lands 244 formed on the bottom side 234 of the cap 250. These lands 244 can be used to electrically connect the microdevice 220 to circuit traces 225 on a circuit board 224 through conductive attachments 228, as are known in the art. The conductive traces 238, 242 are electrically connected and provide the electrical connection between the microstructure 226 and the outside environment.

The cap 250 has a base portion 252, a sidewall 254, and a plurality of conductive vias 296. The sidewall 254 extends outwardly from the base portion 252 and defines a recess 256 in the cap 250. The hermetically sealed cavity 222 is at least partially defined by the recess 256 in the cap 250. Each conductive via 296 is formed through the cap 250. In this embodiment, the cap 250 can be made from a glass wafer as will be shown below. Preferably, the glass is Pyrex 7740 glass supplied by Dow Corning. The conductive via 296 may be an aperture etched in the cap 250 and filed or deposited with a layer of conductive material 242. Preferably, the recess 256 and via are formed by mechanical abrasion, such as a sand blasting process.

As will be shown below, the conductive cover 270 can be made of the same material as the microstructure 226. The conductive cover 270 provides electrical connection to the conductive traces 238 through the cap 250 while providing a flat surface for proper sealing of the cap 250 to the substrate 230.

In a preferred embodiment, the substrate 230 is attached to the conductive cover 270 through a non-adhesive type hermetical seal. For instance, the substrate 230 and the conductive cover 270 can be attached together through an anodic bonding process in a vacuum. Here, the substrate 230 and conductive cover 270 are preferably made of silicon and the cap 250 is preferably made of glass. The outer bonding surface of the cap 250 needs to be planarized and polished. The conductive cover 270 can also be planarized and polished, if needed. The anodic bonding process includes aligning and clamping the substrate 230 and the cap 250, and applying a high voltage between them at a temperature higher than 280 C. At an elevated temperature and a high negative potential, the positive ions inside the glass drift away from the glass surface adjacent to the silicon of the conductive cover into the bulk of the glass, and a high electric field is generated across the air gap between the conductive cover 270 and the glass cap 250 due to the depletion of positive ions at the interface. The high electrostatic forces clamp the two bonding surfaces very tightly to form a strong, uniform and hermetic bond.

In an alternative embodiment, the cap 250 and substrate 230 can be bonded through a glass frit bonding process. Here, a glass frit layer can be deposited on either the bonding surface of the substrate 230 or the bonding surface of the cap 250. The cap 250 and the substrate 230 are then clamped together. The assembly is then heated to a melting temperature of the glass frit. Pressure is continuously applied to the wafer assembly during the period under the melting temperature of the glass frit. The cured glass frit layer is not permeable to moisture and forms a hermetic bond between the cap 250 and the substrate 230. In another alternative embodiment, the cap 250 is attached to the substrate 230 using a metal bonding technique such as a gold eutectic bond.

One of several benefits of this vertical through-wafer via is that it enables the sealed microdevice 220 to be easily attached to a circuit board 224 through a surface mounting technique. This is illustrated in FIG. 3.

Figure 4:
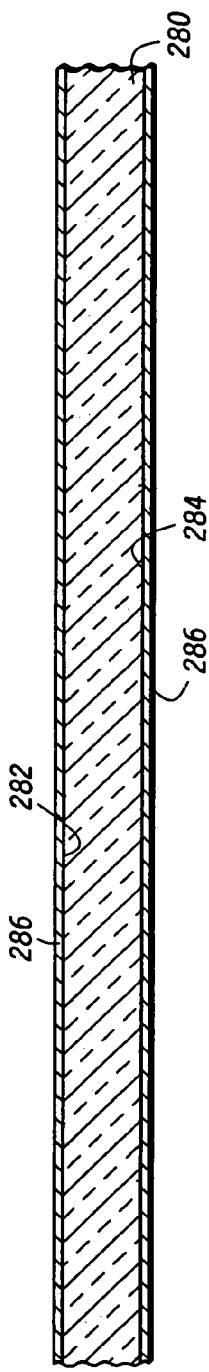
FIGS. 4–9 are cross-sectional views of one embodiment of a method to form and assemble the microdevice shown in FIGS. 1–3.
Figure 5:
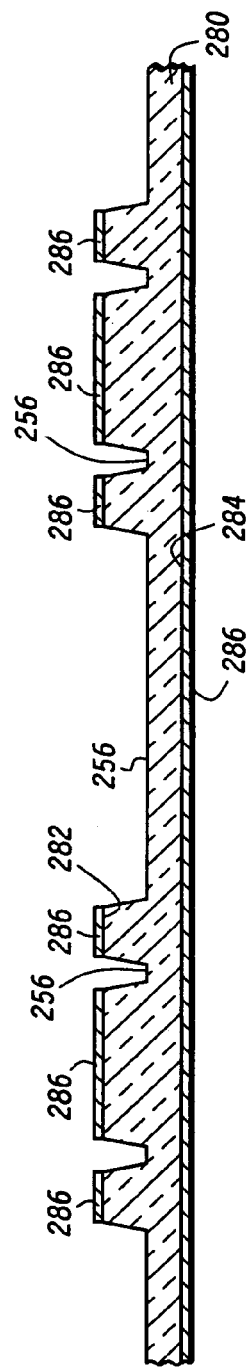

Now, processes for making microdevice 220 as shown in FIGS. 1–3 will be further explained. Referring to FIG. 4, a portion of a glass wafer 280 is shown having a first side 282 and a second side 284. The process includes the step of forming at least one recess 256 on the first side 282 of the glass wafer 280. The recess 256 on the first side 282 of the wafer 280 may be formed using known micromachining methods. In one embodiment, as shown in FIGS. 4 and 5, a masking material 286 is formed and patterned before the micromachining of the recesses 256. Then the recesses 256 may be formed using a sand blasting process, for example. Other techniques such as wet chemical etch in a HF-based solution, laser drilling, and ultrasonic drilling may also be used.

Figure 6:
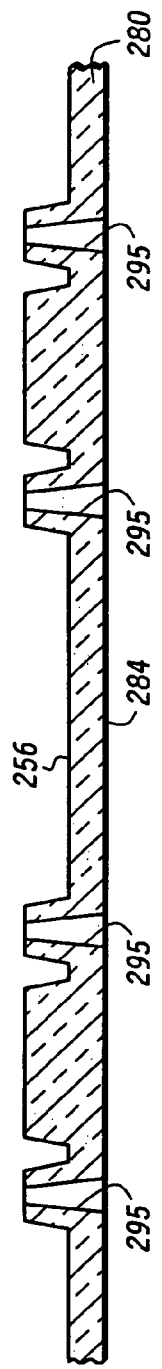

The next step, as shown in FIG. 6, is to form the through-wafer vias 295 in the glass wafer 280 by using one of available techniques, such as sand blasting, laser drilling, ultrasonic drilling or wet etching. Preferably, sand blasting is used. The same masking and sand blasting technique used for the recess in FIGS. 4 and 5 can be duplicated to form the vias using sandblasting from the second side 284. Optionally, the vias can be made at the same time as the recess by sand blasting from both sides of the substrate, given appropriate masking. A benefit of the process described herein is that the vias (and other processes to the glass wafer) are performed prior to bonding the glass wafer 250 to the silicon substrate 230.

The sand blasting process causes surface damage to the vias and recess that can propagate cracks during subsequent thermal processing. In addition, sand blasting can destroy the transparency in the recess. Moreover, sand blasting causes fillets on either edge of the vias making it difficult to provide a continuous metallization throughout the full length of the vias, which can lead to electrical discontinuities. Further, the surface defects from sand blasting can also contribute to discontinuous metallization causing electrical problems. For example, long term mechanical reliability of the vias can be adversely affected during solder sealing or reflow. Also, microcracks caused by sandblasting can propagate during the thermal stress of soldering causing cracks in the glass and potentially loss of hermeticity.

Therefore, it is necessary to further process the glass substrate at this time.

One step is to planarize and polish either or both surfaces 282, 284 of the glass substrate. This can be done using known techniques. The planarizing removes any fillets on the edges of the vias to support good metallization continuity. The planarizing provides a substantially flat surface to support hermetic sealing as described herein. Moreover, polishing returns transparency to the glass and reduces the possibility of crack propagation by reducing stress points and microcracks. However, planarizing and polishing does not eliminate the rough surface within the vias or recessed cavity, which can contribute to electrical discontinuities, crack propagation, and loss of transparency. Therefore, further steps are needed.

The present invention provides a method of treating the surface of mechanically abraded glass. The method includes a first step of providing a glass substrate having opposing first and second surfaces as described above. In particular, the glass substrate has a recess in the first surface formed by mechanical abrasion. The glass substrate can also include at least one via, also formed by mechanical abrasion. Preferably, the mechanical abrasion is sand blasting. However, other techniques can be used. More preferably, this step includes providing a conductive cover on the top surface of the silicon substrate opposing the via. The conductive cover is made of the same silicon as the microstructure and is formed at the same time.

A next step after mechanically abrading the glass is heating the glass substrate to its softening point. For the Pyrex™ 7740 glass described above, the heating step includes heating to a temperature of about 821 Celsius.

A next step is holding the glass substrate at its softening point for a predetermined period of time to polish the recess. For the Pyrex™ 7740 glass described above, the holding step includes holding the glass at its softening point, about 821 Celsius, for at least five minutes. Holding the glass at its softening point longer than five minutes will further improve the surface polish of the recess. However, about five minutes is adequate to sufficiently reduce the problems caused by the mechanical abrasion process.

Optionally, a next step includes planarization and polishing one or both of the top and bottom surfaces (282, 284) to reduce the fillets on the vias caused by the mechanical abrasion process. By eliminating one or both fillets, the process for metalizing the vias becomes much easier and provides more reliable electrical conductivity.

Figure 7:
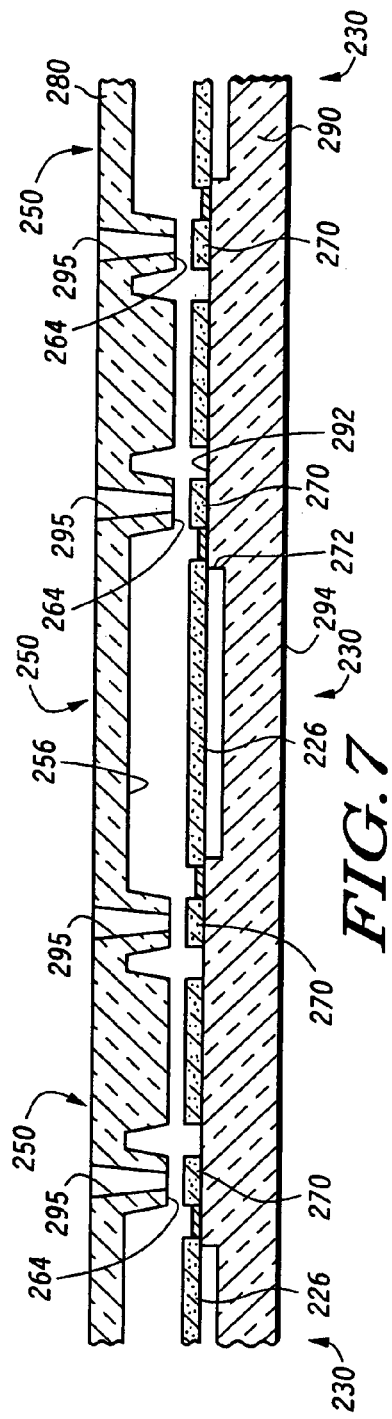

Referring to FIG. 7, the process further includes assembling the glass wafer 280 (having a plurality of caps 250) with the device substrate wafer 290 (having a plurality of device substrates 230). Each device substrate 230 has a microstructure 226, conductive covers 270, and metal traces 238. The wafer assembly step should be done in a vacuum environment and under an elevated temperature. This allows for an initial degassing of the materials included in the microdevice.

Figure 8:
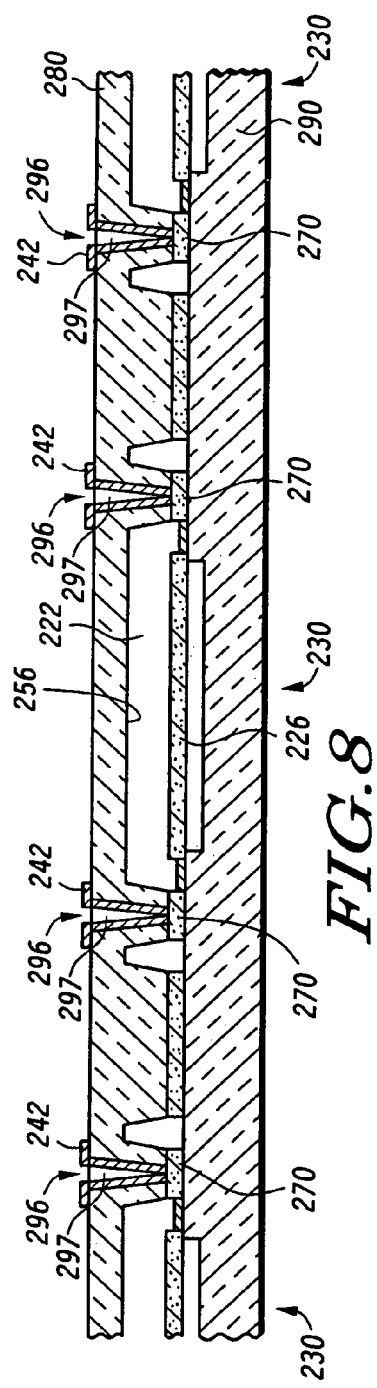

In FIG. 8, the glass cap wafer 280 can be attached to the silicon substrate wafer 290 in a vacuum by using the anodic bonding technique as described above. In particular, this step includes attaching the first surface of the glass substrate to the top surface of the silicon substrate to provide a hermetically sealed cavity defined by the recess in the first surface of the glass substrate and the top surface of the silicon substrate. Preferably, this step includes anodic bonding of the glass substrate to the conductive cover of the silicon substrate such that the conductive cover covers the via. Also shown in FIG. 8, the through-wafer vias are metalized and patterned to form a conductive via 296 having a conductive land 242.

The vias 296 need to be hermetically sealed. One way to provide a hermetic seal for the vias 296 is through the use of conductive covers 270. In one embodiment, the conductive covers 270 are made of silicon and attached to the substrate 230 in a region opposing the vias 296. The conductive covers 270 are preferably formed from the same silicon wafer that the device microstructure 226 is formed. Moreover, the conductive covers 270 have preferably the same thickness as the device microstructure 226. Making the conductive covers 270 out of the same silicon wafer as the device microstructure 226 reduces the complexity of the manufacturing process. The manufacturing of silicon devices is known in the art and is not covered here. An alternative process to hermetically seal the vias 296 is to use a solder ball. The process steps include placing the solder ball onto the via 296, performing solder ball degassing, and melting the ball in vacuum to hermetically seal 297 the via 296.

Figure 9:
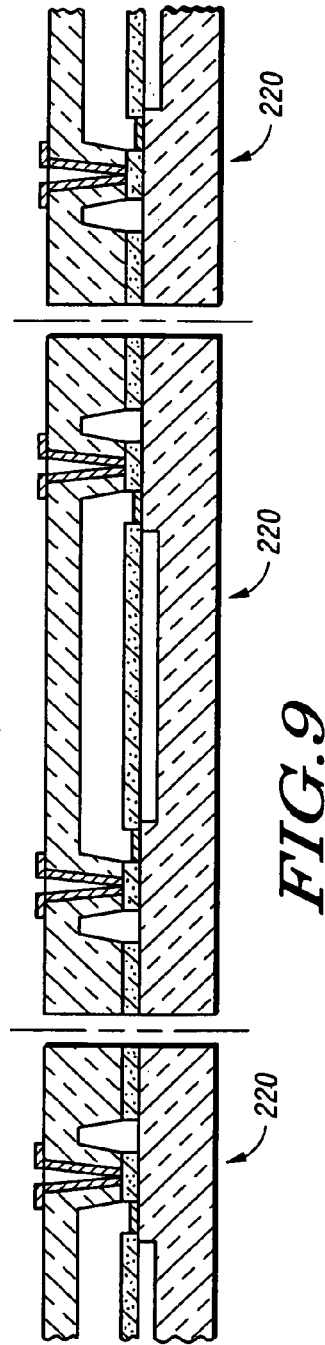

The next step in the process is to dice the wafer assembly into individual microdevices 220 as shown in FIG. 9.

What has been described is a method of providing surface treatment to a glass substrate in the manufacture of a microdevice having conductive feedthroughs for electrically connecting a microstructure sealed in a vacuum cavity to the outside environment. The present invention, in one embodiment, provides a better method of surface treatment to allow more uniform sealing and allowing easier deposition of conductive through-wafer vias. The surface treatment makes the device more reliable because cracks or other defects in the vias will not disrupt the hermetically sealed cavity during subsequent high temperature processing. It should be recognized that the present invention also provides the methods of sealing microstructures in wafer level with conductive through-wafer vias inside the cavity. The use of a glass cap with conductive vias formed on the cap and conductive via covers formed on the device substrate enables a reliable hermetic seal. The embodiments taught herein significantly reduce the cost of making a vacuum-sealed microdevice by using low cost materials and processes. This is particularly important to high volume applications.

The above description of the present invention is intended to be exemplary only and is not intended to limit the scope of any patent issuing from this application. The present invention is intended to be limited only by the broad scope of the following claims.

What is claimed is:

1. A method of treating the surface of mechanically abraded glass, the method comprising the steps of:
   providing a glass substrate having opposing first and second surfaces, the glass substrate having a recess in the first surface formed by mechanical abrasion;
   heating the glass substrate to its softening point; and
   holding the glass substrate at its softening point for a predetermined period of time to polish the recess.

2. The method of claim 1, wherein the providing step includes providing Pyrex 7740 glass, and the heating step includes heating to a temperature of about 821 Celsius.

3. The method of claim 1, wherein the holding step includes holding the glass substrate at its softening point for at least five minutes.

4. The method of claim 1, further comprising the steps of mechanically planarizing and polishing the first surface to a condition of substantial flatness.

5. The method of claim 4, wherein the providing step includes providing a second substrate with a top surface, and further comprising the step of attaching the first surface of the glass substrate to the top surface of the second substrate to provide a hermetically sealed cavity defined by the recess in the first surface of the glass substrate and the top surface of the second substrate.

6. The method of claim 5, wherein the providing step includes providing a via through the glass substrate and a conductive cover on the top surface of the second substrate opposing the via, and wherein the attaching step comprises anodic bonding the glass substrate to the conductive cover such that the conductive cover covers the via.

7. The method of claim 6, wherein the second substrate and conductive cover are made of silicon.

8. A method of treating the surface of mechanically abraded glass, the method comprising the steps of:
   providing a glass substrate having opposing first and second surfaces, the glass substrate having a recess in the first surface and at least one via in the glass substrate that extends through the glass substrate from the first surface to the second surface, wherein the recess and at least one via are formed by sand blasting;
   heating the glass substrate to its softening point;
   holding the glass substrate at its softening point for a predetermined period of time to polish the recess and the at least one via; and
   planarizing and polishing the first surface to a condition of substantial flatness.

9. The method of claim 8 wherein the providing step includes providing Pyrex 7740 glass, and wherein the heating step includes heating to a temperature of about 821 Celsius, and wherein the holding step includes holding the glass substrate at its softening point for at least five minutes.

10. The method of claim 8, wherein the providing step includes providing a second substrate with a top surface, and further comprising the step of attaching the first surface of the glass substrate to the top surface of the second substrate to provide a hermetically sealed cavity defined by the recess in the first surface of the glass substrate and the top surface of the second substrate.

11. The method of claim 10, wherein the providing step includes providing a silicon conductive cover on the top surface of the second substrate, and wherein the attaching step comprises anodic bonding the glass substrate to the conductive cover such that the conductive cover covers the via.

12. The method of claim 10, further comprising the step of metalizing an interior surface of the at least one via to provide an electrical connection from outside of the package to inside of the recess through the via metallization and the conductive cover.

13. The method of claim 12, further comprising the step of filling the vias with solder to provide a hermetic seal.

14. A method of treating the surface of sand blast drilled glass, the method comprising the steps of:
   providing a glass substrate having opposing first and second surfaces and a second substrate with a top surface, the glass substrate having a recess in the first surface formed by sand blasting and at least one sand blasted via in the glass substrate that extends through the glass substrate from the first surface to the second surface;
   heating the glass substrate to its softening point;
   holding the glass substrate at its softening point for a predetermined period of time to polish the recess and the at least one via; and
   attaching the first surface of the glass substrate to the top surface of the second substrate to provide a hermetically sealed cavity defined by the recess in the first surface of the glass substrate and the top surface of the second substrate.

15. The method of claim 14, wherein the providing step includes providing Pyrex 7740 glass, and wherein the heating step includes heating to a temperature of about 821 Celsius, and wherein the holding step includes holding the glass substrate at its softening point for at least five minutes.

16. The method of claim 14, wherein before the attaching step further comprising the step of planarizing and polishing the first surface to a condition of substantial flatness.

17. The method of claim 14, wherein the providing step includes providing a silicon conductive cover between the first surface of the glass substrate and the top surface of the second substrate, and wherein the attaching step comprises anodic bonding the glass substrate to the conductive cover such that the conductive cover covers the via.

18. The method of claim 14, further comprising the step of metalizing an interior surface of the at least one via to provide an electrical connection from outside of the package to inside of the recess through the via metallization and the conductive cover.

19. The method of claim 18, further comprising the step of filling the vias with solder to provide a hermetic seal.

* * * * *